(12) United States Patent
Snider

(10) Patent No.: US 11,761,522 B2
(45) Date of Patent: Sep. 19, 2023

(54) ACTUATOR INTEGRATION APPARATUS AND SYSTEM

(71) Applicant: Kurt H. Snider, Harrison, MI (US)

(72) Inventor: Kurt H. Snider, Harrison, MI (US)

( * ) Notice: Subject to any disclaimer, the term of this patent is extended or adjusted under 35 U.S.C. 154(b) by 92 days.

(21) Appl. No.: 17/527,984

(22) Filed: Nov. 16, 2021

(65) Prior Publication Data

US 2022/0154811 A1    May 19, 2022

Related U.S. Application Data

(60) Provisional application No. 63/114,355, filed on Nov. 16, 2020.

(51) Int. Cl.
*F16H 37/12*    (2006.01)

(52) U.S. Cl.
CPC .................. *F16H 37/124* (2013.01)

(58) Field of Classification Search
CPC ..................................................... F16H 37/124
See application file for complete search history.

(56) References Cited

U.S. PATENT DOCUMENTS

| | | | |
|---|---|---|---|
| 2,685,260 A * | 8/1954 | Auger | E04H 6/18 74/25 |
| 4,442,390 A * | 4/1984 | Davis | G05D 3/1472 318/660 |
| 4,901,589 A * | 2/1990 | Gaigl | F16H 37/124 425/444 |
| 6,614,195 B2 | 9/2003 | Bushey et al. | |
| 2018/0066741 A1 * | 3/2018 | Luo | F03G 5/06 |

OTHER PUBLICATIONS

Xiang Gao, How to Remote Control Linear Actuator Motor via Mobile Phone WiFi Controller, Jul. 1, 2014, youtube.com.
Yaya Life Store, 12V RF remote control linear actuator Metal gear stroke actuators with power supply for garage door window open, May 1, 2020, aliexpress.com.
SMAC Moving Coil Actuators, LAL Series Linear Actuators, Date Unavailable, smac-mca.com.
Progressive Automations, Force Feedback With LCD Screen, Sep. 15, 2015, https://www.instructables.com/.

\* cited by examiner

*Primary Examiner* — Terence Boes

(57) ABSTRACT

An actuator integration apparatus and system provide a means for integrating a digitized control system and remote operation functionality not existing manually operated machinery. At least one actuator unit is mounted to a mounting chassis with at least one mounting clamp to provide access and engagement to at least one lever. The at least one lever is further connected to or otherwise integrated to the control scheme of the external machinery. A power supply is provided to supply operating electrical power, and an external terminal is configured to generate and transmit operable commands to the at least one actuator unit to moderate the position of the at least one lever by extension.

17 Claims, 7 Drawing Sheets

ACTUATOR INTEGRATION APPARATUS AND SYSTEM

FIELD OF THE INVENTION

The present invention relates to actuators. More specifically, the present invention is a programmable linear actuator system configured as a modular attachment to external devices to enable remote operation of physical controls.

BACKGROUND OF THE INVENTION

Technology over the past years has gradually grown throughout history and will continue to grow as technology become more innovative and creative as time goes on. The usage of actuators is found almost everywhere in the technological world. More specifically, linear actuators are used in machine tools and industrial machinery as they serve an essential part with how machinery and tools operate. Not only are linear actuators found in machine tools and industrial machinery, but they are found in almost every existing technology such as printers, automatic doors, cars, etc. . . . . Linear actuators are simply found within technology that requires a linear motion. Most cases, linear actuators are very limiting in what they are able to do due to the range of motion available and inability to accurately control the movement.

An objective of the present invention is to provide a linear actuator that allow a wide range of movement in terms of range of motion. The present invention also provides accurate controlled movement compared to existing linear actuators. In addition, the present invention can be controlled wirelessly by means of a wireless remote. Furthermore, the present invention is programmable with the ability to determine the length of stroke and/or reverse stroke direction and is able to provide the user a custom parameter for the different machines in which the present invention is used with.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

Figure 1:
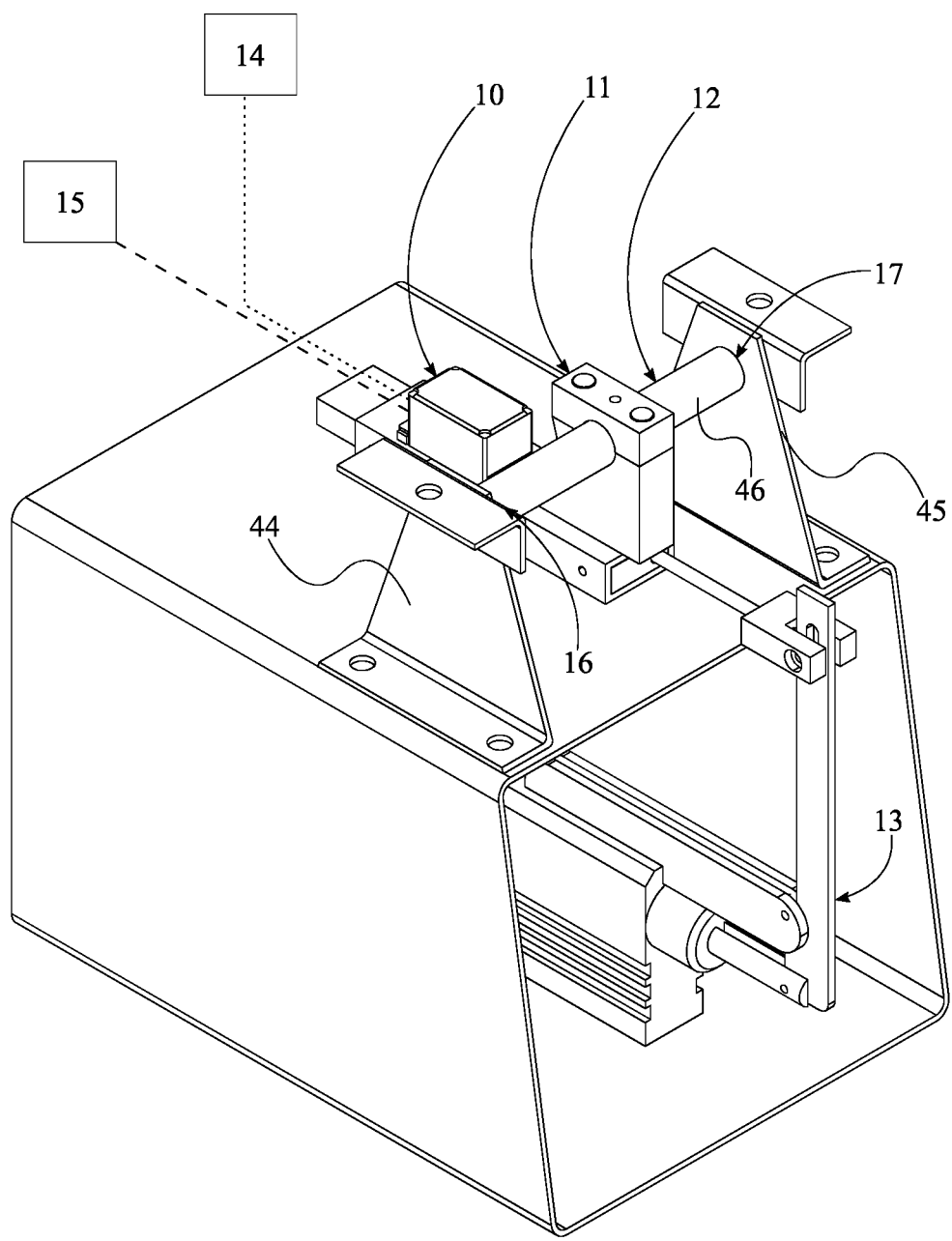
FIG. 1 is a top-front-left perspective view of one embodiment of the present invention.

In reference to FIG. 1 through 5, the present invention is an actuator integration apparatus configured in a first embodiment as a modification to existing control valves, switches, or other manually operable machinery as may be realized by a reasonably skilled individual. The integration of the present invention to these external systems ideally allows for a programmable control logic to be enacted in the normal operation of the external machinery, specifically in use-cases wherein an operator or user may be displaced from said machinery during operation. A primary example of this configuration would be in the application of the present invention to a commercial woodchipper, shredder, or thresher—the operator may engage the present invention to the conventional controls of the machinery to enable remote operation, avoiding the operating zone of the machine itself and any potential hazards therein. As illustrated in FIG. 1, the first embodiment of the present invention comprises at least one actuator unit 10, at least one actuator clamp 11, a mounting chassis 12, at least one offset lever 13, an external terminal 14, and a power supply 15 in the first embodiment. The at least one actuator unit 10 constitutes any controllable motive component suitable for acting as a surrogate for manual control, i.e., a means of replicating the direct operation of any external machinery.

The at least one actuator unit 10 encompasses any type or variety of linear or rotary actuator in the broadest reasonable conception, or any combination thereof as may correspond to the type of external machinery being controlled thereby. As shown in the exemplary FIG. 2A through 3B, the at least one actuator unit 10 constitutes a bidirectional-stroke linear actuator configured to operably extend and retract under direction from the operator via the external terminal 14.

Figure 5:
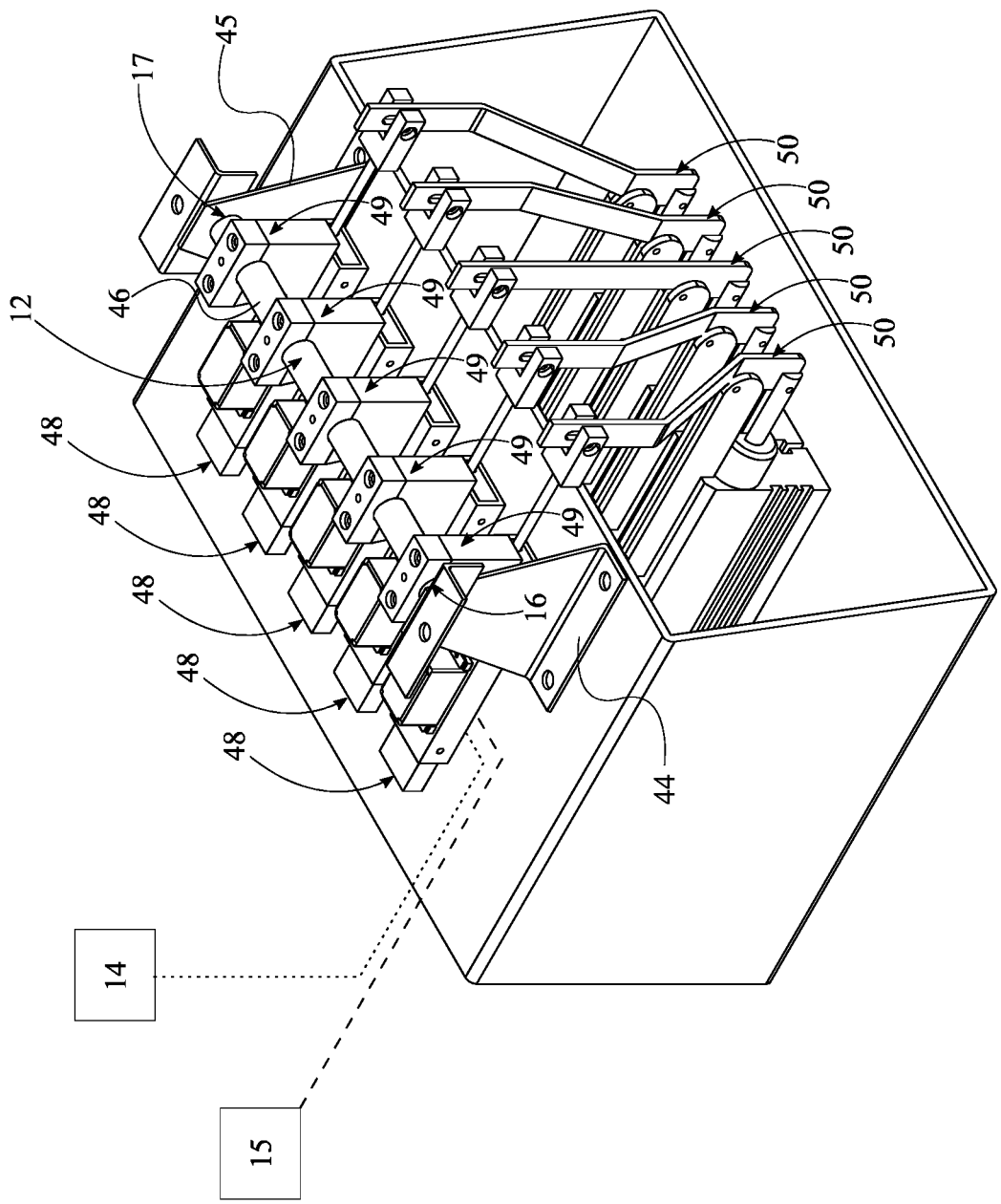
FIG. 5 is a perspective view of an expanded version of the present invention, wherein the present invention is configured for use.

The mounting chassis 12 and the at least one actuator clamp 11 provide an adjustable, releasable means of affixing the at least one actuator unit 10 into an operable position relative to the external machinery, wherein the mounting chassis 12 defines a static superstructure and the at least one mounting clamp defines any adjustable fastening component suitable to engage between the mounting chassis 12 and the at least one actuator unit 10. More specifically, the mounting chassis 12 extends between a first lateral extremis 16 and a second lateral extremis 17 as indicated in FIGS. 1 and 5. Each of the at least one actuator clamp 11 is mounted between once of the at least one actuator unit 10 and the mounting chassis 12 between the first lateral extremis 16 and the second lateral extremis 17. This arrangement enables the at least one actuator clamp 11, and the at least one actuator unit 10 by extension, to be repositioned along the mounting chassis 12 to occupy an optimal engagement position against any external switch, control box, valve, or machinery in general.

Further, each of the at least one offset lever 13 is attached to one of the at least one actuator unit 10 to enable the at least one actuator unit 10 to effectively engage with the external machinery, also as shown in FIGS. 1 and 5. The offset lever broadly encompasses any physical connection instantiated between the at least one actuator unit 10 and the external machinery to be modified by the installation of the present invention. In the first embodiment, the at least one offset lever 13 defines a pinned beam and fulcrum engaged to the at least sone actuator unit to provide a mechanical advantage against an exemplary valve head. The illustrated embodiment should not be construed as limiting to the scale, shape, or leverage geometry of the at least one offset leaver in any other potential embodiment, and any variations therein are within the original scope and spirit of the present invention.

The power supply 15 is electrically connected to the at least one actuator unit 10 to provide any necessary operating power to said instance of the at least one actuator unit 10. In a preferred embodiment, the power supply 15 constitutes a parasitic tap integrated to the external machinery being modified by the present invention, wherein the external machinery is configured with a source of electrical power suitable to supply the present invention as an accessory to the primary function of said external machinery. In another embodiment, the power supply 15 may define a discrete battery cell or array of cells mounted to the external machinery in tandem with each of the at least one actuator unit 10, i.e., the power supply 15 is integrated to each of the at least one actuator unit 10 as a self-supported module.

The external terminal 14 defines any human-machine interface configured to generate and transmit movement commands to the at least one actuator unit 10. In the first embodiment, the external terminal 14 is a radio-linked switch box wirelessly communicating with the at least one actuator unit 10 to establish operational control of the external machinery from a distance. The external terminal 14 may also be configured to monitor and report on the status and condition of the at least one actuator unit 10 and the power supply 15 to increase the granularity of data available to the operator, minimizing any need to manually inspect or adjust the at least one actuator unit 10 once initial installation of the present invention to the external machinery is complete. It is further considered that the external terminal 14 may be connected to the at least one actuator unit 10 by a hard line or conductive cable in at least one embodiment, the wireless functionality being supplanted for a more simplistic configuration. In the broadest terms, the external terminal 14 is electronically connected to the at least one actuator unit 10 by any means as may be realized by a reasonably skilled individual. Through this connection, the external terminal 14 moderates the position of the at least one offset lever 13 via the at least one actuator unit 10. The offset lever is connected between the external machinery and the at least one actuator unit 10 as outlined previously, thereby completing the operational link between the user and the external machinery with the present invention as an intermediary.

As illustrated in FIG. 2A through 4, at least one actuator unit 10 further comprises a housing 19, a driver assembly 20, a driver guide 21, and a servomotor 22. The housing 19 extending between a fore end 23 and a rear end 24 to provide a protective enclosure for the moving components of the at least one actuator unit 10. The driver guide 21 is positioned into the housing 19 between the fore end 23 and the rear end 24, ideally being fully encapsulated within the housing 19 to protect the full draw of the driver guide 21 and any sensitive or tolerance components positioned in reference to said driver guide 21. The driver guide 21 refers to a modular component of the at least one actuator unit 10 that is compatible with the driver assembly 20, including any alternate embodiments or instances required to support the driver assembly 20. Accordingly, the driver assembly 20 is slidably mounted into the driver guide 21. This modularity enables the driver guide 21 and the driver assembly 20 to be interchanged independently to adapt the at least one actuator unit 10 to effectively engage with a variety of external machinery, expanding the potential applications of the present invention without substantially departing from the first embodiment.

In reference to FIG. 2A through 3B, the servomotor 22 is mounted to the housing 19 between the fore end 23 and the rear end 24, orthogonal to the driver guide 21. The servomotor 22 is engaged to the driver assembly 20, wherein the motor moderates the position of the driver assembly 20 within the driver guide 21 based upon operable commands issued from the external terminal 14. In support of the modular construction of the at least one actuator unit 10 outlined above, the engagement of the servomotor 22 to the driver assembly 20 is ideally achieved through a standardized mechanical engagement to enable the servomotor 22 to be interchanged with, for example, embodiments that provide greater operating torque or faster travel speed, dependent upon individual needs in any given use-case.

Figure 2A:
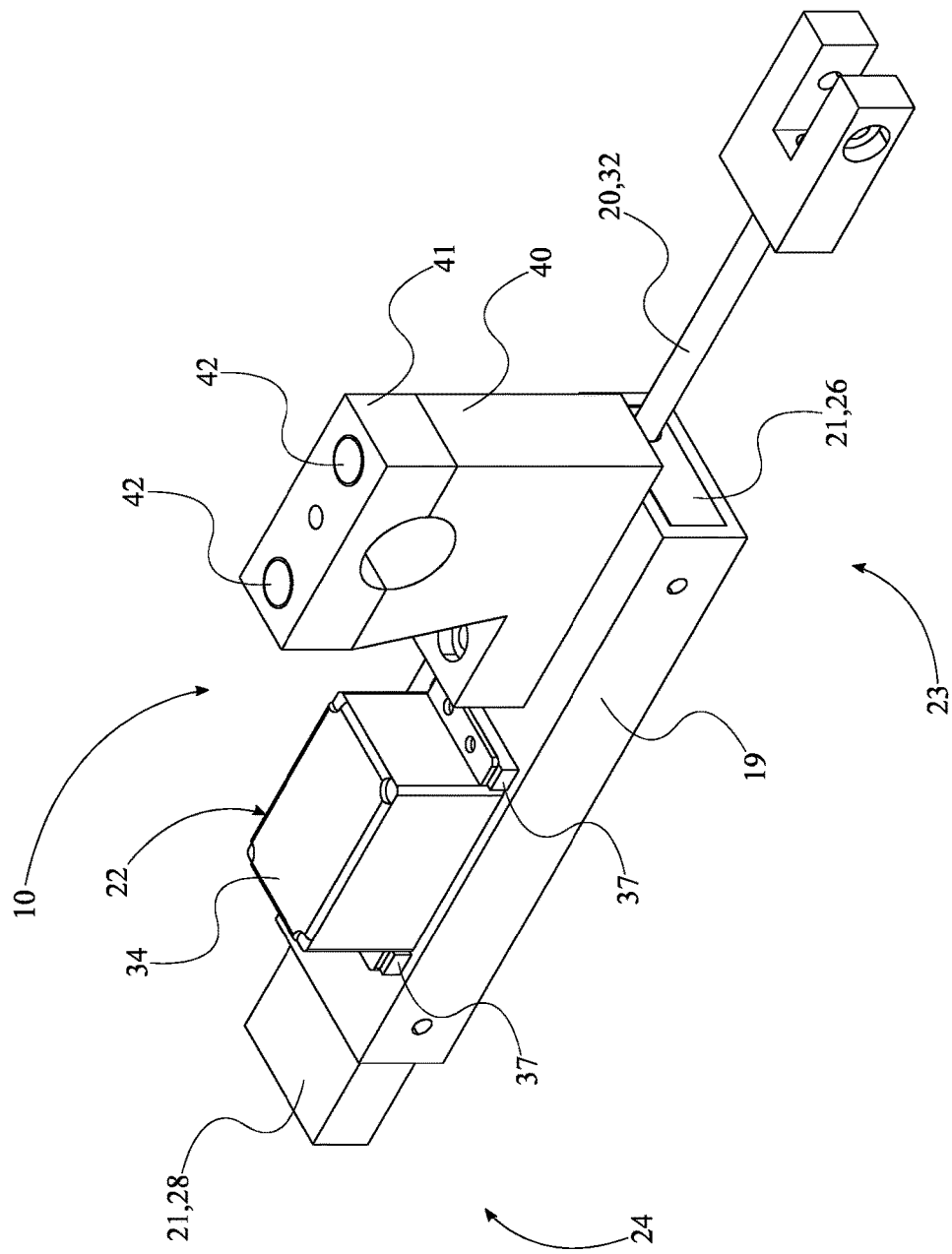
FIG. 2A is a top-front-right perspective view thereof, wherein the operable component of the present invention is illustrated in detail.
Figure 2B:
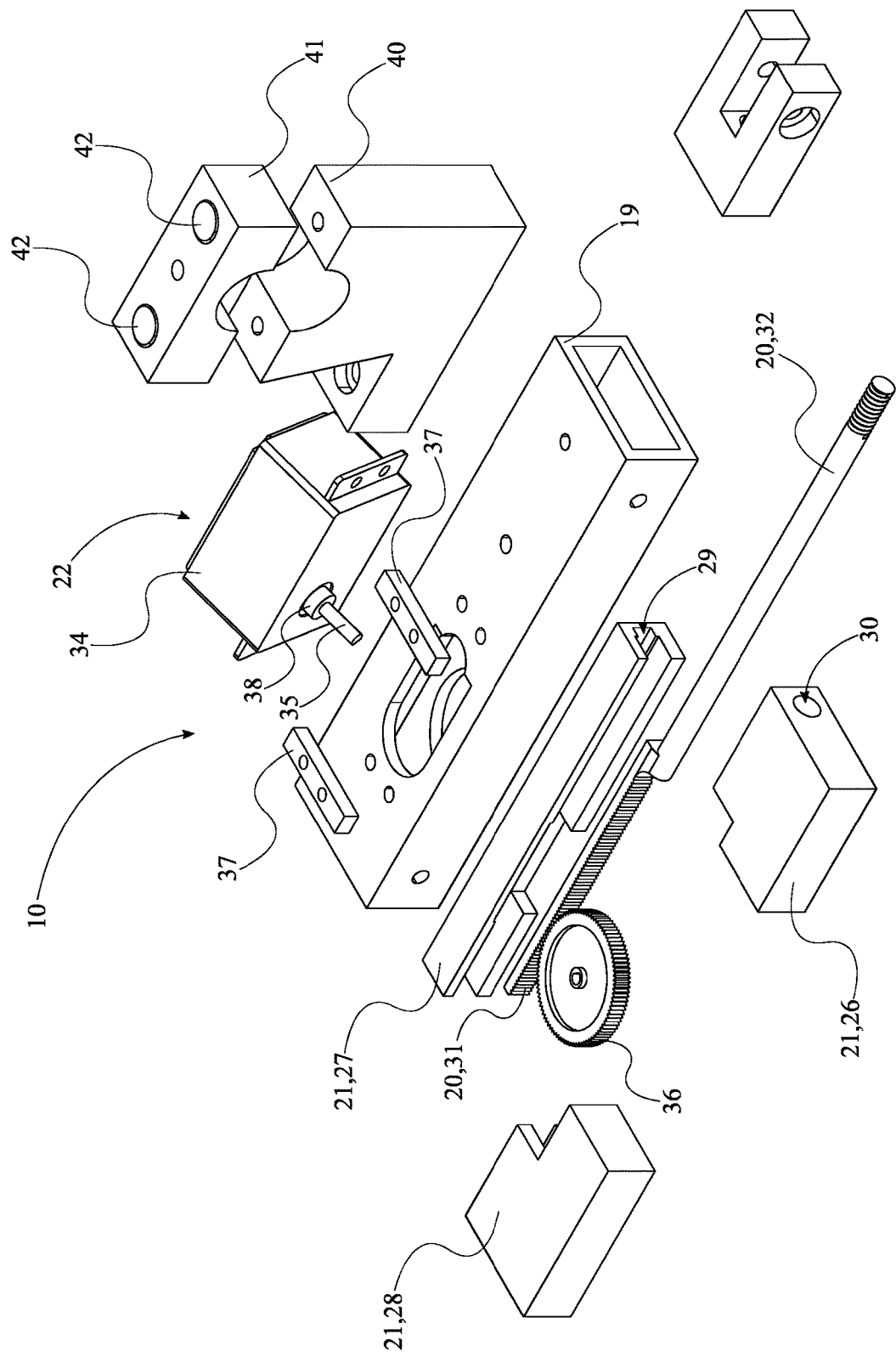
FIG. 2B is an exploded perspective view thereof.
Figure 3A:
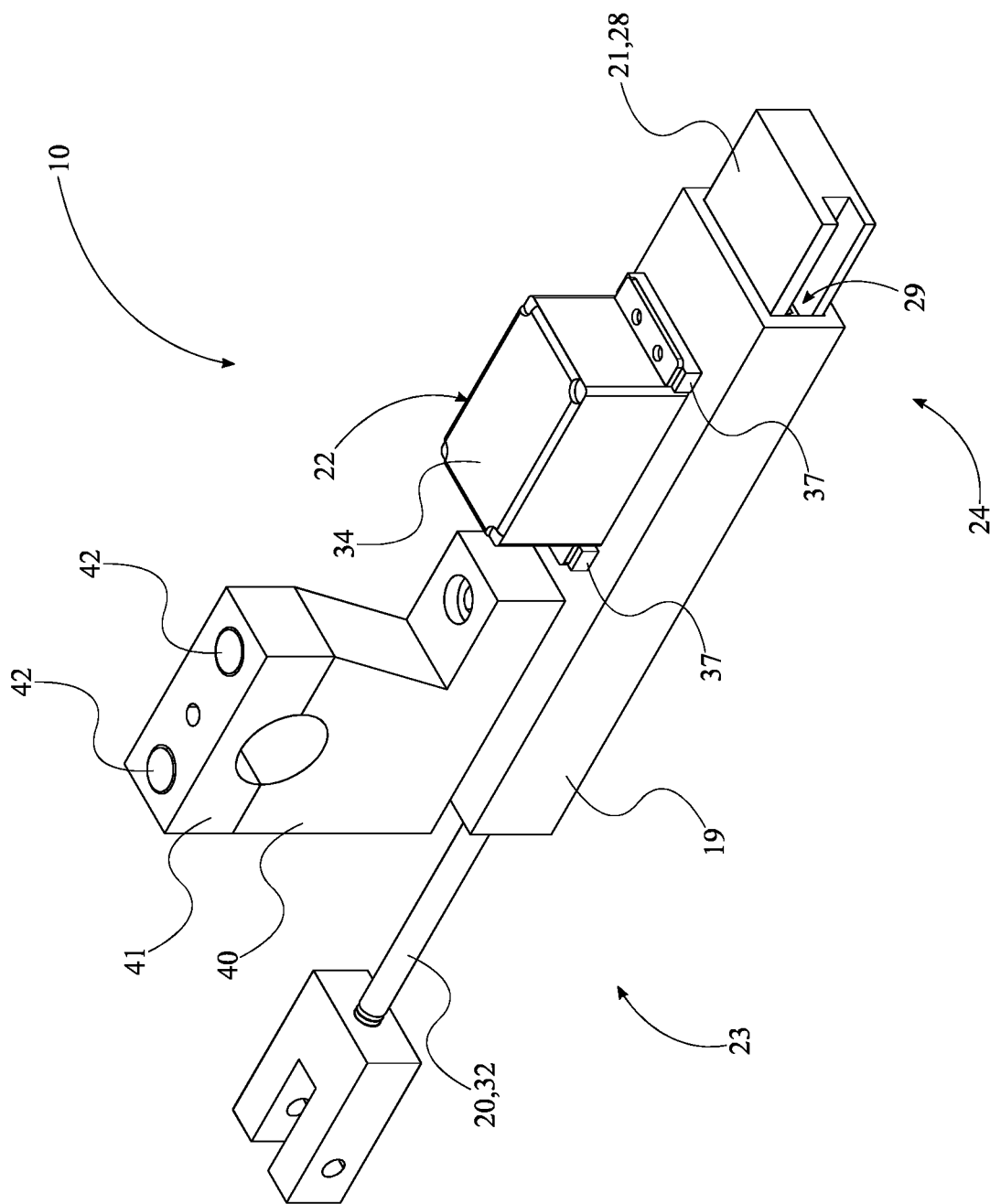
FIG. 3A is a top-back-left perspective view thereof, wherein the operable component of the present invention is illustrated in detail thereof.
Figure 3B:
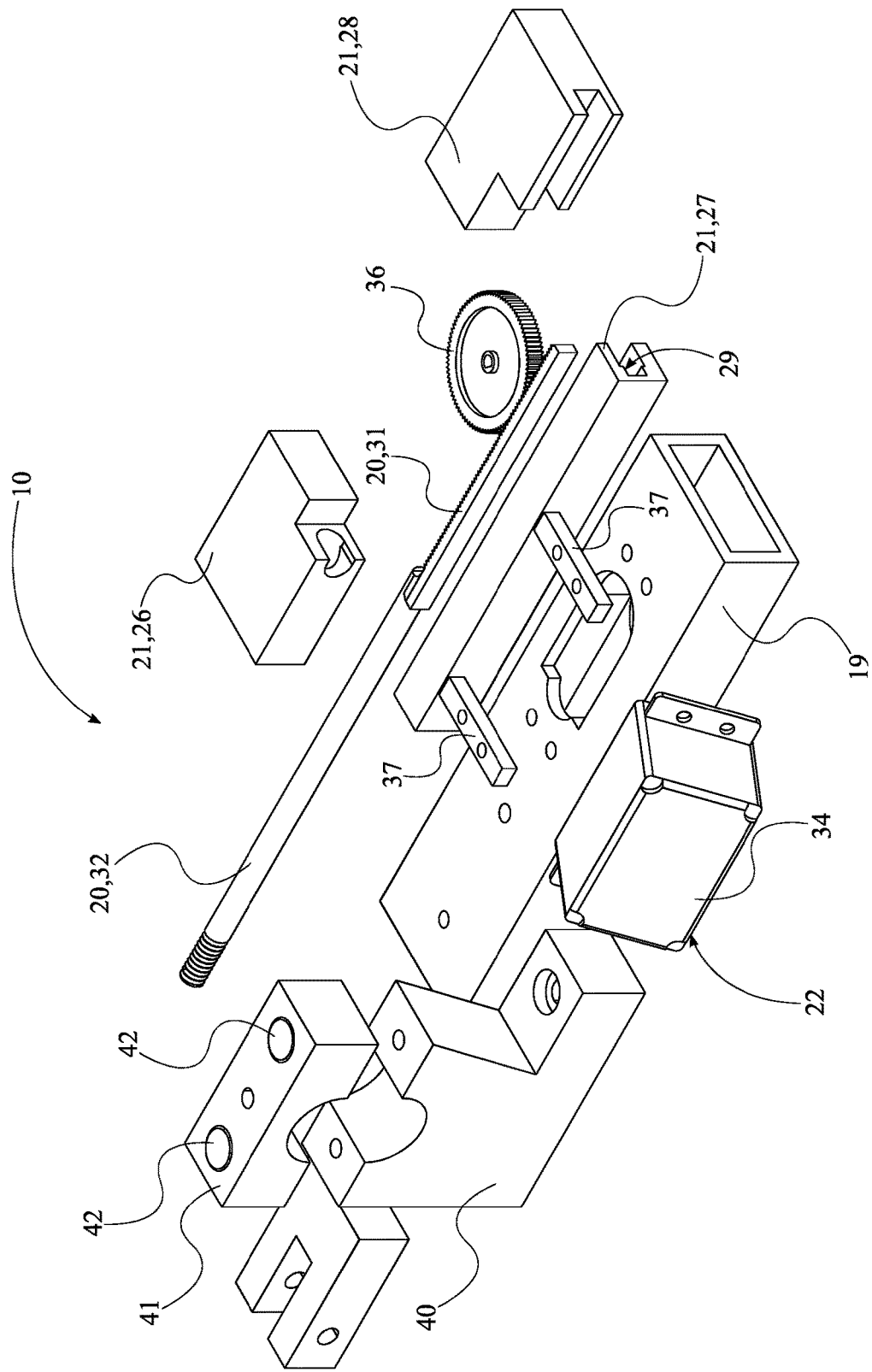
FIG. 3B is an exploded perspective view thereof.

As shown in FIGS. 2B and 3B, the driver guide 21 further comprises a front cap 26, an interstitial block 27, and a rear cap 28. The front cap 26, the interstitial block 27, and the rear cap 28 are sequentially positioned into the housing 19 between the fore end 23 and the rear end 24. A rack channel 29 traverses the rear cap 28 and the interstitial block 27 between the rear end 24 and the front cap 26, and a rod channel 30 traverses the front cap 26 between the interstitial block 27 and the fore end 23. The separation of the driver guide 21 provides a simplified manufacturer specification by simplifying the geometry of all constituent parts thereof. Further, the housing 19 provides a bounding structure for the front cap 26, the interstitial block 27, and the rear cap 28 to minimize or eliminate any misalignment between the separated components of the driver guide 21.

Figure 4:
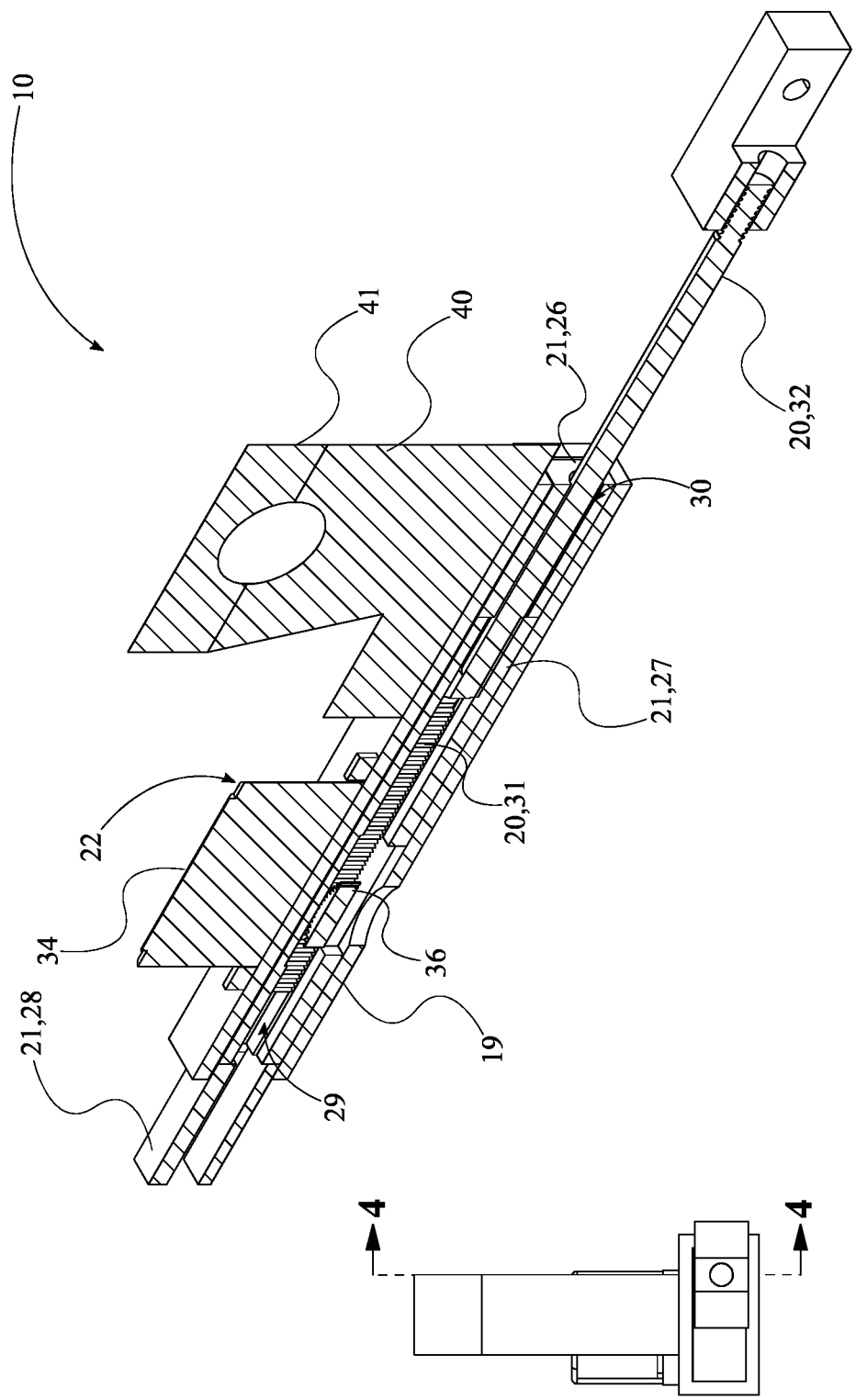
FIG. 4 is a composite sectional view taken along line 4-4.

The separation of the rack channel 29 and the rod channel 30 prevents the driver assembly 20 from overrunning the driver guide 21 to either the fore end 23 or the rear end 24 by physically impeding the progress of separate, corresponding sections of the driver assembly 20. Referring to FIG. 4, the driver assembly 20 further comprises a toothed rack 31 and an operating rod 32. The toothed rack 31 is slidably positioned in the rack channel 29 and the operating rod 32 is slidably positioned into the rod channel 30. The operating rod 32 is terminally connected to the toothed rack 31 within the rack channel 29, wherein front cap 26 limits travel of the driver assembly 20 towards the fore end 23. To elaborate, as the driver assembly 20 advances towards the fore end 23, the toothed rack 31 will impinge upon the front cap 26 and halt movement of the driver assembly 20 along the driver guide 21. This arrangement prevents any overextension of the driver assembly 20 and retains the toothed rack 31 in the rack channel 29. Likewise, movement of the driver assembly 20 towards the rear end 24 is supported by the rack channel 29 accepting the toothed rack 31 into the rear cap 28, but travel is arrested by the operating rod 32 impinging upon the servomotor 22 within the interstitial block 27.

It is further considered that the servomotor 22 may be reconfigured to match any embodiment of the driver assembly 20, or to adjust to changing operating conditions without exchanging the entire servomotor 22. As indicated in FIGS. 2B and 3B, the servomotor 22 further comprises a motor body 34, an output shaft 35, a pinion gear 36, at least one standoff block 37, and an encoder 38. The motor body 34 refers to the outer casing and windings of the servomotor 22, including any supporting bushings or bearing surfaces supporting the output shaft 35 therein. Accordingly, the output shaft 35 rotatably positioned into the motor body 34 and constitutes any means of translating torsional power out of the servomotor 22. The pinion gear 36 is connected between the output shaft 35 and the driver assembly 20 to provide a gear reduction to increase the effective torque of the servomotor 22. Like the other modularized components described herein, the pinion gear 36 may be exchanged with alternate instances of the same component to maintain compatibility between the driver assembly 20 and the servomotor 22. Likewise, the at least one standoff block 37 is positioned between the motor body 34 and the housing 19 to adjust the engagement of the pinion gear 36 to the driver assembly 20. More specifically, the at least one standoff block 37 constitutes an interchangeable shim to ensure that the pinion gear 36 is in alignment with the driver assembly 20 to prevent slippage or excessive wear of the pinion gear 36 over time. The encoder 38 is connected between the output shaft 35 and the motor body 34, wherein the encoder 38 is configured to reference a rotational position of the output shaft 35 to the external terminal 14 during normal operations. In conjunction with the external terminal 14, the encoder 38 is configured to measure a displacement (delta) from a given starting position set by the operator. In a second embodiment of the present invention, the external terminal 14 utilizes this recorded delta as a reference to reverse the servomotor 22 after every issued command to return the at least one actuator unit 10 to the neutral starting position. This functionality is particularly suitable for use with any valve-based external machinery controls, wherein the return to neutral position is necessary to cease the flow of fluid through said valve.

The means of situating and arranging the at least one actuator unit 10 onto the mounting chassis 12 in relation to the external machinery is integral to the function of the present invention. Accordingly, the at least one mounting clamp provides a releasable, directionally flexible means of attaching the at least one actuator unit 10 onto the mounting chassis 12. In reference to FIGS. 2A and 3A, the at least one mounting clamp comprises a base jaw 40, an upper jaw 41, and at least one clamp fastener 42. The base jaw 40 is mounted to the at least one actuator unit 10 and the upper jaw 41 is positioned onto the mounting chassis 12, opposite the base jaw 40 such that the upper jaw 41 and the lower jaw substantially enclose any exposed portion of the mounting chassis 12. The at least one clamp fastener 42 is releasably fixed between the base jaw 40 and the upper jaw 41, whereby the upper jaw 41 and the base jaw 40 are drawn together about the mounting chassis 12 to affect a fixture between the at least one mounting clamp and the mounting chassis 12. The clamp fastener broadly constitutes any type of threaded bolt or screw suitable for spanning between the upper jaw 41 and the base jaw 40, but ideally the at least one fastener is retained in the upper jaw 41 as shown in exemplary form.

It is further proposed that the mounting chassis 12 is modularized in a similar manner to the at least one actuator unit 10, thereby enabling an operator to configure the mounting chassis 12 for any application or installation. As indicated in FIGS. 1 and 5, the mounting chassis 12 further comprises a first riser 44, a second riser 45, and a common rail 46. The first riser 44 is terminally connected to the common rail 46 adjacent to the first lateral extremis 16 and the second riser 45 is terminally connected to the common rail 46 adjacent to the second lateral extremis 17. The first riser 44 and the second riser 45 constitute independent upright supports, spacers, brackets, or stanchions that are interchangeable to compatibilize the present invention with any form of external machinery as may be realized by a reasonably skilled individual. Further, the common rail 46 preferably defines a length-adjustable or likewise interchangeable component suitable for supporting the direct attachment of at least one mounting clamp as previously outlined. In reference to FIGS. 1 and 5, the common rail 46 may be adjusted to support any multitude or combination of the at least one actuator unit 10 upon any given external machinery.

In an expanded third embodiment of the present invention illustrated in FIG. 5, the core components of the present invention are arranged into a banked configuration or arrayed across the external machinery in relation to a switch-box, valve body, or other combined control scheme. This arrangement of controls in a centralized location requires a commensurately centralized means of independently actuating said controls, i.e., multiple instances of the present invention as-described operating in concert. Accordingly, the at least one actuator unit 10 is a plurality of actuator units 48 and the at least one actuator clamp 11 is a plurality of actuator clamps 49. Each of the plurality of actuator units 48 is individually connected to the mounting chassis 12 via each of the plurality of actuator clamps 49. Further, the at least one offset lever 13 is a plurality of offset levers 50 with each of the plurality of offset levers 50 being connected to each of the plurality of actuator units 48. Each of the plurality of offset levers 50 corresponds to any single control on the external machinery, with each of the plurality of actuator units 48 being responsible for operating each control independently of any other control. This control logic is extended to the external terminal 14, wherein the external terminal 14 is configured to independently control each of the plurality of actuator units 48 corresponding to each of the plurality of offset levers 50.

Although the invention has been explained in relation to its preferred embodiment, it is to be understood that many other possible modifications and variations can be made without departing from the spirit and scope of the invention as hereinafter claimed.

What is claimed is:

1. An actuator integration apparatus and system comprising:
   at least one actuator unit;
   at least one actuator clamp;
   a mounting chassis;
   at least one offset lever;
   an external terminal;
   a power supply;
   the mounting chassis extending between a first lateral extremis and a second lateral extremis;
   each of the at least one actuator clamp being mounted between one of the at least one actuator unit and the mounting chassis between the first lateral extremis and the second lateral extremis;
   each of the at least one offset lever being attached to one of the at least one actuator unit;
   the power supply being electrically connected to the at least one actuator unit; and
   the external terminal being electronically connected to the at least one actuator unit, wherein the external terminal moderates the position of the at least one offset lever via the at least one actuator unit;
   the mounting chassis further comprising a first riser, a second riser, and a common rail; and
   the first riser being terminally connected to the common rail adjacent to the first lateral extremis and the second riser being terminally connected to the common rail adjacent to the second lateral extremis.

2. The actuator integration apparatus and system as claimed in claim 1 comprising:
at least one actuator unit further comprising a housing, a driver assembly, a driver guide, and a servomotor;
the housing extending between a fore end and a rear end;
the driver guide being positioned into the housing between the fore end and the rear end;
the driver assembly being slidably mounted into the driver guide;
the servomotor being mounted to the housing between the fore end and the rear end, orthogonal to the driver guide; and
the servomotor being engaged to the driver assembly, wherein the motor moderates the position of the driver assembly within the driver guide.

3. The actuator integration apparatus and system as claimed in claim 2 comprising:
the driver guide further comprising a front cap, an interstitial block, and a rear cap;
the front cap, the interstitial block, and the rear cap being sequentially positioned into the housing between the fore end and the rear end;
a rack channel traversing the rear cap and the interstitial block between the rear end and the front cap;
a rod channel traversing the front cap between the interstitial block and the fore end;
the driver assembly further comprising a toothed rack and an operating rod;
the toothed rack being slidably positioned in the rack channel;
the operating rod being slidably positioned into the rod channel; and
the operating rod being terminally connected to the toothed rack within the rack channel, wherein front cap limits travel of the driver assembly towards the fore end.

4. The actuator integration apparatus and system as claimed in claim 2 comprising:
the servomotor further comprising a motor body, an output shaft, a pinion gear, at least one standoff block, and an encoder;
the output shaft being rotatably positioned into the motor body;
the pinion gear being connected between the output shaft and the driver assembly;
the at least one standoff block being positioned between the motor body and the housing; and
the encoder being connected between the output shaft and the motor body, wherein the encoder is configured to reference a rotational position of the output shaft to the external terminal.

5. The actuator integration apparatus and system as claimed in claim 1 comprising:
at least one mounting clamp comprising a base jaw, an upper jaw, and at least one clamp fastener;
the base jaw being mounted to the at least one actuator unit;
the upper jaw being positioned onto the mounting chassis; and
the at least one clamp fastener being releasably fixed between the base jaw and the upper jaw.

6. The actuator integration apparatus and system as claimed in claim 1 comprising:
at least one actuator unit being a plurality of actuator units;
the at least one actuator clamp being a plurality of actuator clamps;
the at least one offset lever being a plurality of offset levers;
each of the plurality of actuator units being individually connected to the mounting chassis via each of the plurality of actuator clamps;
each of the plurality of offset levers being connected to each of the plurality of actuator units; and
the external terminal being configured to independently control each of the plurality of actuator units corresponding to each of the plurality of offset levers.

7. An actuator integration apparatus and system comprising:
at least one actuator unit;
at least one actuator clamp;
a mounting chassis;
at least one offset lever;
an external terminal;
a power supply;
the mounting chassis extending between a first lateral extremis and a second lateral extremis;
each of the at least one actuator clamp being mounted between once one of the at least one actuator unit and the mounting chassis between the first lateral extremis and the second lateral extremis;
each of the at least one offset lever being attached to one of the at least one actuator unit;
the power supply being electrically connected to the at least one actuator unit;
the external terminal being electronically connected to the at least one actuator unit, wherein the external terminal moderates the position of the at least one offset lever via the at least one actuator unit;
at least one actuator unit further comprising a housing, a driver assembly, a driver guide, and a servomotor;
the housing extending between a fore end and a rear end;
the driver guide being positioned into the housing between the fore end and the rear end;
the driver assembly being slidably mounted into the driver guide;
the servomotor being mounted to the housing between the fore end and the rear end, orthogonal to the driver guide; and
the servomotor being engaged to the driver assembly, wherein the motor moderates the position of the driver assembly within the driver guide.

8. The actuator integration apparatus and system as claimed in claim 7 comprising:
the driver guide further comprising a front cap, an interstitial block, and a rear cap;
the front cap, the interstitial block, and the rear cap being sequentially positioned into the housing between the fore end and the rear end;
a rack channel traversing the rear cap and the interstitial block between the rear end and the front cap;
a rod channel traversing the front cap between the interstitial block and the fore end;
the driver assembly further comprising a toothed rack and an operating rod;
the toothed rack being slidably positioned in the rack channel;
the operating rod being slidably positioned into the rod channel; and
the operating rod being terminally connected to the toothed rack within the rack channel, wherein front cap limits travel of the driver assembly towards the fore end.

9. The actuator integration apparatus and system as claimed in claim 7 comprising:
the servomotor further comprising a motor body, an output shaft, a pinion gear, at least one standoff block, and an encoder;
the output shaft being rotatably positioned into the motor body;
the pinion gear being connected between the output shaft and the driver assembly;
the at least one standoff block being positioned between the motor body and the housing; and
the encoder being connected between the output shaft and the motor body, wherein the encoder is configured to reference a rotational position of the output shaft to the external terminal.

10. The actuator integration apparatus and system as claimed in claim 7 comprising:
at least one mounting clamp comprising a base jaw, an upper jaw, and at least one clamp fastener;
the base jaw being mounted to the at least one actuator unit;
the upper jaw being positioned onto the mounting chassis; and
the at least one clamp fastener being releasably fixed between the base jaw and the upper jaw.

11. The actuator integration apparatus and system as claimed in claim 7 comprising:
the mounting chassis further comprising a first riser, a second riser, and a common rail; and
the first riser being terminally connected to the common rail adjacent to the first lateral extremis and the second riser being terminally connected to the common rail adjacent to the second lateral extremis.

12. The actuator integration apparatus and system as claimed in claim 7 comprising:
at least one actuator unit being a plurality of actuator units;
the at least one actuator clamp being a plurality of actuator clamps;
the at least one offset lever being a plurality of offset levers;
each of the plurality of actuator units being individually connected to the mounting chassis via each of the plurality of actuator clamps;
each of the plurality of offset levers being connected to each of the plurality of actuator units; and
the external terminal being configured to independently control each of the plurality of actuator units corresponding to each of the plurality of offset levers.

13. An actuator integration apparatus and system comprising:
at least one actuator unit;
at least one actuator clamp;
a mounting chassis;
at least one offset lever;
an external terminal;
a power supply;
the mounting chassis extending between a first lateral extremis and a second lateral extremis;
each of the at least one actuator clamp being mounted between once one of the at least one actuator unit and the mounting chassis between the first lateral extremis and the second lateral extremis;
each of the at least one offset lever being attached to one of the at least one actuator unit;
the power supply being electrically connected to the at least one actuator unit;
the external terminal being electronically connected to the at least one actuator unit, wherein the external terminal moderates the position of the at least one offset lever via the at least one actuator unit;
at least one actuator unit further comprising a housing, a driver assembly, a driver guide, and a servomotor;
the housing extending between a fore end and a rear end;
the driver guide being positioned into the housing between the fore end and the rear end;
the driver assembly being slidably mounted into the driver guide;
the servomotor being mounted to the housing between the fore end and the rear end, orthogonal to the driver guide;
the servomotor being engaged to the driver assembly, wherein the motor moderates the position of the driver assembly within the driver guide;
the driver guide further comprising a front cap, an interstitial block, and a rear cap;
the front cap, the interstitial block, and the rear cap being sequentially positioned into the housing between the fore end and the rear end;
a rack channel traversing the rear end and the interstitial block between the rear end and the front cap;
a rod channel traversing the front cap between the interstitial block and the fore end;
the driver assembly further comprising a toothed rack and an operating rod;
the toothed rack being slidably positioned in the rack channel;
the operating rod being slidably positioned into the rod channel; and
the operating rod being terminally connected to the toothed rack within the rack channel, wherein front cap limits travel of the driver assembly towards the fore end.

14. The actuator integration apparatus and system as claimed in claim 13 comprising:
the servomotor further comprising a motor body, an output shaft, a pinion gear, at least one standoff block, and an encoder;
the output shaft being rotatably positioned into the motor body;
the pinion gear being connected between the output shaft and the driver assembly;
the at least one standoff block being positioned between the motor body and the housing; and
the encoder being connected between the output shaft and the motor body, wherein the encoder is configured to reference a rotational position of the output shaft to the external terminal.

15. The actuator integration apparatus and system as claimed in claim 13 comprising:
at least one mounting clamp comprising a base jaw, an upper jaw, and at least one clamp fastener;
the base jaw being mounted to the at least one actuator unit;
the upper jaw being positioned onto the mounting chassis; and
the at least one clamp fastener being releasably fixed between the base jaw and the upper jaw.

16. The actuator integration apparatus and system as claimed in claim 13 comprising:
the mounting chassis further comprising a first riser, a second riser, and a common rail; and
the first riser being terminally connected to the common rail adjacent to the first lateral extremis and the second riser being terminally connected to the common rail adjacent to the second lateral extremis.

17. The actuator integration apparatus and system as claimed in claim 13 comprising:

- at least one actuator unit being a plurality of actuator units;
- the at least one actuator clamp being a plurality of actuator clamps;
- the at least one offset lever being a plurality of offset levers;
- each of the plurality of actuator units being individually connected to the mounting chassis via each of the plurality of actuator clamps;
- each of the plurality of offset levers being connected to each of the plurality of actuator units; and
- the external terminal being configured to independently control each of the plurality of actuator units corresponding to each of the plurality of offset levers.

* * * * *